(12) United States Patent
Gomes

(10) Patent No.: US 9,747,106 B1
(45) Date of Patent: Aug. 29, 2017

(54) ALLOCATING MULTIPLE OPERAND DATA AREAS OF A COMPUTER INSTRUCTION WITHIN A PROGRAM BUFFER

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/282,129

(22) Filed: Sep. 30, 2016

(51) Int. Cl.
| G06F 9/34 | (2006.01) |
| G06F 5/12 | (2006.01) |
| G06F 5/14 | (2006.01) |
| G06F 13/40 | (2006.01) |
| G06F 9/38 | (2006.01) |
| G06F 5/06 | (2006.01) |
| G06F 3/06 | (2006.01) |
| G06F 12/02 | (2006.01) |
| H04L 12/861 | (2013.01) |

(52) U.S. Cl.
CPC .............. *G06F 9/34* (2013.01); *G06F 9/3836* (2013.01); *G06F 3/0608* (2013.01); *G06F 3/0656* (2013.01); *G06F 5/065* (2013.01); *G06F 5/12* (2013.01); *G06F 5/14* (2013.01); *G06F 12/023* (2013.01); *G06F 2212/1044* (2013.01); *H04L 49/9005* (2013.01)

(58) Field of Classification Search
CPC . G06F 9/34; G06F 9/3836; G06F 5/12; G06F 5/14; G06F 3/0608; G06F 12/023; G06F 3/0656; G06F 2212/1044; G06F 5/065; H04L 49/9005
USPC ............... 712/214, 215; 710/52–57; 711/171
See application file for complete search history.

(56) References Cited

U.S. PATENT DOCUMENTS

| 5,974,523 | A | 10/1999 | Glew et al. | |
| 6,412,063 | B1 | 6/2002 | Samra | |
| 6,631,478 | B1 * | 10/2003 | Wang | G06F 11/1471 |
| | | | | 714/15 |
| 7,574,569 | B2 * | 8/2009 | Avergun | G06F 12/123 |
| | | | | 711/154 |
| 7,834,881 | B2 | 11/2010 | Liu et al. | |
| 8,838,899 | B2 | 9/2014 | Walker | |
| 2009/0094433 | A1 * | 4/2009 | Thomas | G06F 3/061 |
| | | | | 711/172 |
| 2013/0198437 | A1 * | 8/2013 | Omizo | G06F 12/0246 |
| | | | | 711/103 |

* cited by examiner

*Primary Examiner* — Daniel Pan
(74) *Attorney, Agent, or Firm* — Cantor Colburn LLP; Steven Chiu

(57) ABSTRACT

The disclosure herein provides systems, methods, and computer program products for managing a plurality of operands in a computer instruction. To manage the plurality of operands, a data buffer manager executed by a processor receives information from a caller. The information relates to the plurality of operands. The data buffer manager, also, compares a free data area size to a requested minimum data area of an operand size identified by the information; selects an address when the requested minimum data area is less than or equal to the free data area size; and inserts the operand at the address.

18 Claims, 6 Drawing Sheets

ALLOCATING MULTIPLE OPERAND DATA AREAS OF A COMPUTER INSTRUCTION WITHIN A PROGRAM BUFFER

BACKGROUND

In general, computer instructions of conventional computing systems can have up to two operands, each of which respectively points to data areas in a data buffer of a software program (program buffer). Each operand data area can have a fixed or variable length that ranges from zero to a size of the program buffer where that operand data area would reside. Each operand data area can also have other requirements, such as a randomly chosen address and/or a length that conforms to operand characteristics. In an example, the operand characteristics can comprise a starting address boundary, a non-overlapping architecture requirement, and a page crossing (i.e., a special memory boundary crossing requirement). Also, all operand data areas can have the same data area requirement or each operand data area can individually have a different data area requirement. The conventional computing systems utilize conventional data buffer managers to fit all operand data areas in the same program buffer with different data area requirements.

However, some computer instructions have more than two operands that point to data areas in the program buffer (e.g., cryptography instructions that have four operands that point to four different data areas in the program buffer). As the number of operands that point to data area increases, a complexity of assigning all the data areas within the same program buffer using conventional methods also increases. Therefore, there is a need for new data buffer manager that can handle any number of operand data areas in the program buffer.

SUMMARY

According to one embodiment, a method for managing a plurality of operands in a computer instruction is provided. The method comprises receiving, by a data buffer manager executed by a processor, information from a caller, wherein the information relates to the plurality of operands. The method also comprises comparing, by the data buffer manager, a free data area size to a requested minimum area of an operand size identified by the information. The method further comprises selecting, by the data buffer manager, an address when the requested minimum area is less than or equal to the free data area size. The method comprises inserting, by the data buffer manager, the operand at the address. Embodiments herein also include the above method implemented as a system and computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

The disclosure relates generally to allocating multiple operand data areas of a computer instruction within a program buffer, and more specifically, to a data buffer manager configured to perform iterative method that builds individual operands in support of managing one or more operands. In this way, the data buffer manager can manage or handle as many operands as a program buffer can support and when the program buffer has reached a data area limit, the data buffer manager can return to a caller to increase the size of the program buffer. Embodiments disclosed herein may include a system, a method, and/or a computer program product that implements the data buffer manager.

In an embodiment, the data buffer manager can be configured to manage or handle any number of operand data areas in a program data buffer by utilizing an application programmable interface (API) of a data structure with respect to one or more operands of an instruction of a program. The data buffer manager can be configured to manage or handle each entry of a data structure containing information about an operand data area. The data buffer manager can be configured to add a new entry into the data structure after processing an operand data area successfully. If the data buffer manager fails to insert an operand data area into the program data buffer, then the data buffer manager can return an error indicator to the program. Note that issuance of the error indicator cause the program to clear the API of the data structure, reduce a size of one or more operand data area (e.g., if possible), and/or increase the size of the program buffer and try again.

Figure 1:
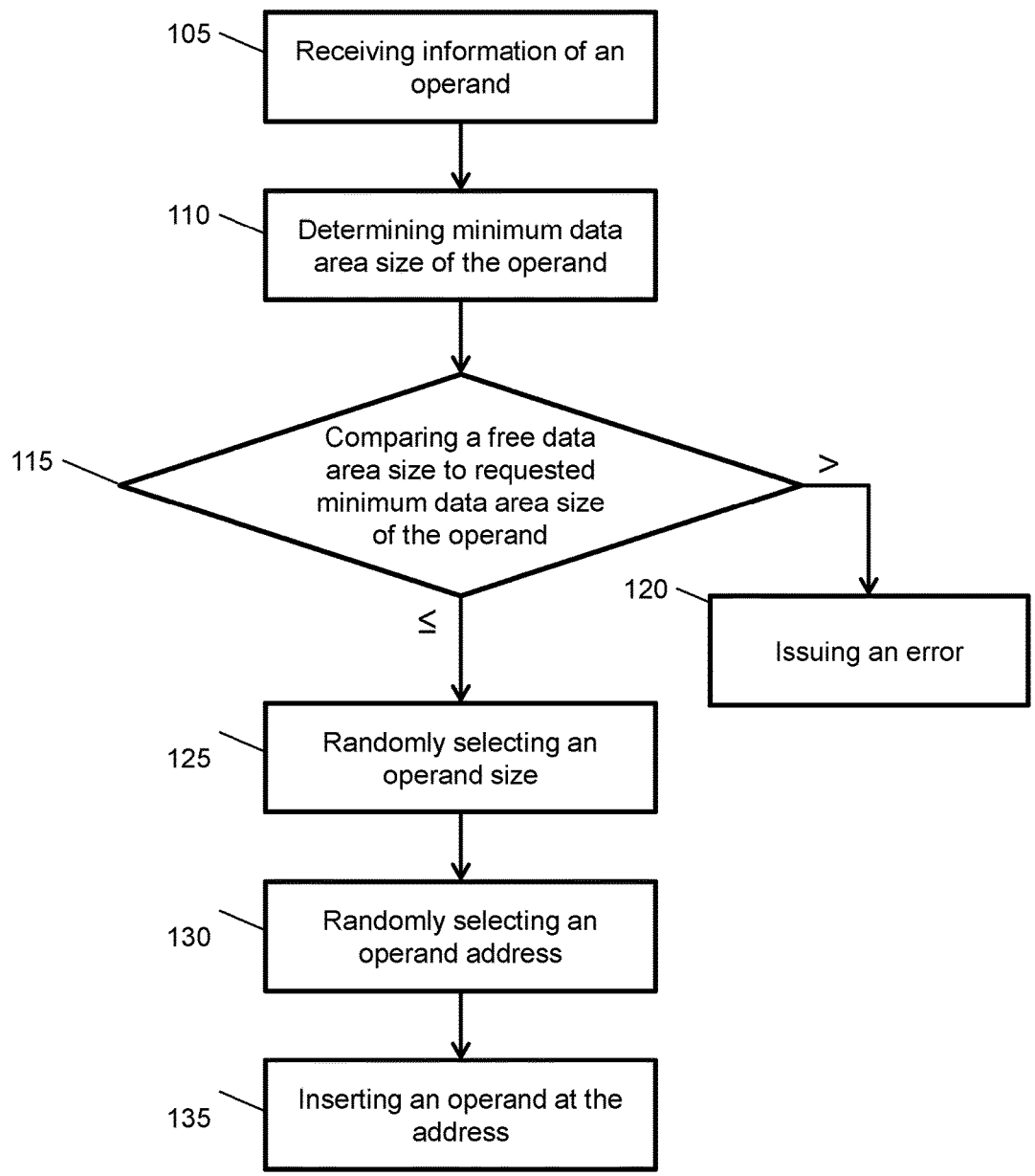
FIG. 1 illustrates a process flow of a data buffer manager in accordance with an embodiment.

Turning now to FIG. 1, a process flow 100 of a data buffer manager is shown in accordance with an embodiment. The process flow 100 illustrates communication between a software program and the data buffer manager through an API. The software program can be referred to as a caller that is issuing computer instructions and providing the information of each operand to the data buffer manager using the API. The data buffer manager can be referred to as a service that utilizes the API to manage a data buffer.

The process flow 100 begins at block 105, where the service receives information from the caller. The information of each can relate to a range-length-range of a corresponding operand. Note that range-length-range can be a low-high range where if a confused caller uses high-low range, a sort routine can inspect each length range and swap the range values if necessary. The receiving of information is on a per-call basis. That is, for each operand, the caller repeatedly calls the service. For example, if a computing instruction of the software program includes four operands, then the software program (caller) makes four calls to the service.

At block 110, the service determines a minimum data area size of the operand. At decision block 115, the service compares a free data size to a requested minimum data area of the operand size. The free data area size corresponds to the data available in a data buffer managed by the service. If the requested minimum area is greater than the free data size, then the process flow 100 proceeds to block 120 (as indicated by the '>' arrow). At block 120, an error is issued to the caller by the service.

If the requested minimum area is less than or equal to the free data size, then the process flow 100 proceeds to block 125 (as indicated by the '<' arrow). At block 125, the service randomly selects a data area size of the operand. At block 130, the service randomly selects an operand address. At block 135, the service inserts the operand at the address.

Figure 2:
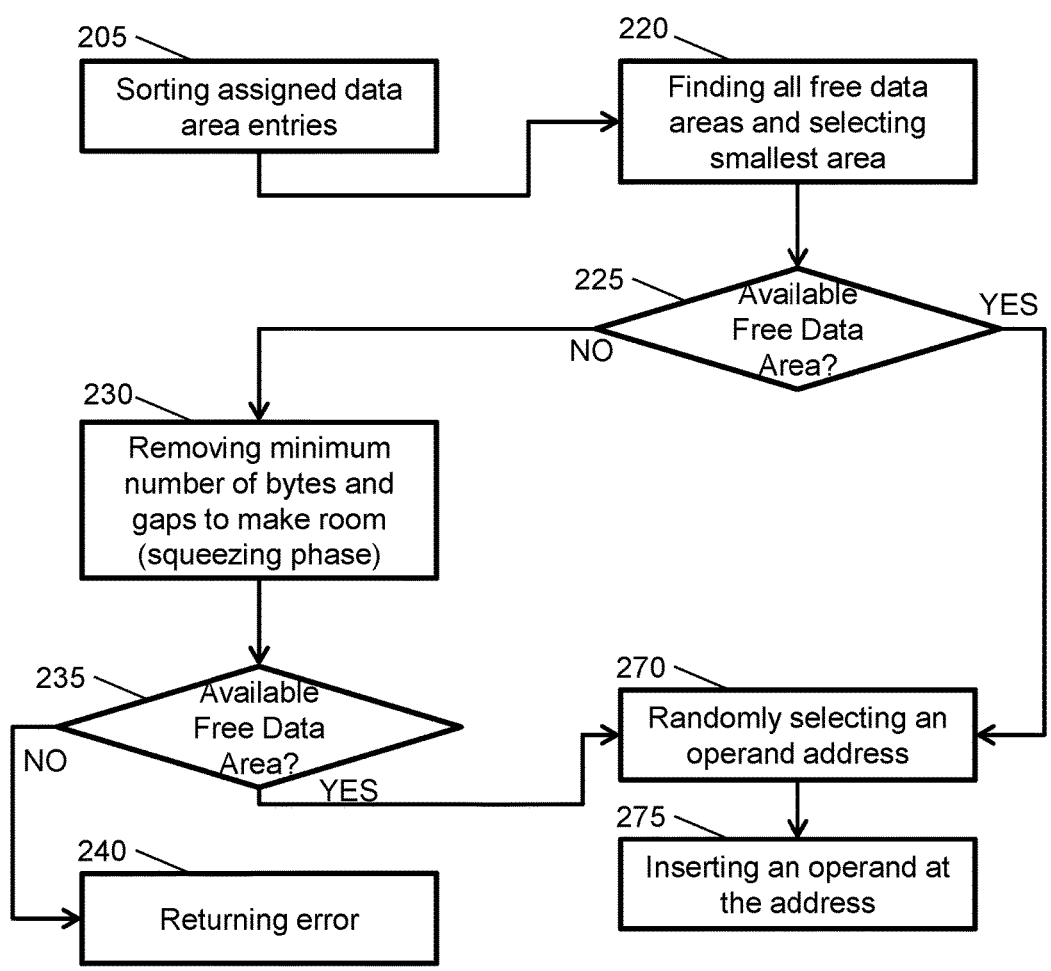
FIG. 2 illustrates a process flow of a data buffer manager for a fixed length in accordance with an embodiment.

Turning now to FIG. 2, a process flow 200 of a data buffer manager for a fixed length operand in accordance with an embodiment. The process flow 200, in general, relates to how a data buffer manager assigns one operand's data area at a time for a computer instruction when the operands are of a fixed size. The process flow 200 begins at block 205, where a data manager sorts assigned data entries. In an embodiment, sorting assigned data entries comprises sorting all the assigned data area entries (if more than one entry) of a data structure using the operand data area addresses in ascending order. At block 220, the data buffer manager finds all the free data areas based on the currently assigned data areas addresses and selects the smallest free data area that can hold the requested size of the operand's data area. From block 220, the process flow 200 proceeds to decision block 225.

At decision block 225, the data buffer manager determines the status of free data areas. For instance, the data buffer manager determines whether the free data area is less than a requested minimum. If the selected free data area is smaller than the operand's minimum data area that is requested by the caller, then the process flow 200 proceeds to block 230 (as indicated by the 'NO' arrow). At block 230, the data area manager removes a minimum number of bytes (between the minimum and current) and gaps of assigned data areas (from largest to smallest) to create enough room and then selects free data area. At decision block 235, the data buffer manager determines the status of free data areas. For instance, the data buffer manager determines whether the free data area is less than the requested minimum. If the selected free data area is smaller than the operand's minimum data area that is requested by the caller, then the process flow 200 proceeds to block 240 (as indicated by the 'NO' arrow). At block 240, the data buffer manager returns an error indicator to the caller (because there is not enough space in the data buffer).

Returning to decision blocks 225 and 235, the process flow 200 can proceed to block 270 when the selected free data area is large enough to hold the operand's data area (and the size of the operand is fixed; as indicated by the 'YES' arrows). At block 270, the data buffer manager randomly selects the address of the operand's data area between the selected fee data area address and selected free data area end address minus the randomly selected size. At block 275, the data buffer manager inserts the operand's data area into the selected free data area and creates a new entry in the common data structure with the operand's data area information.

Figure 3:
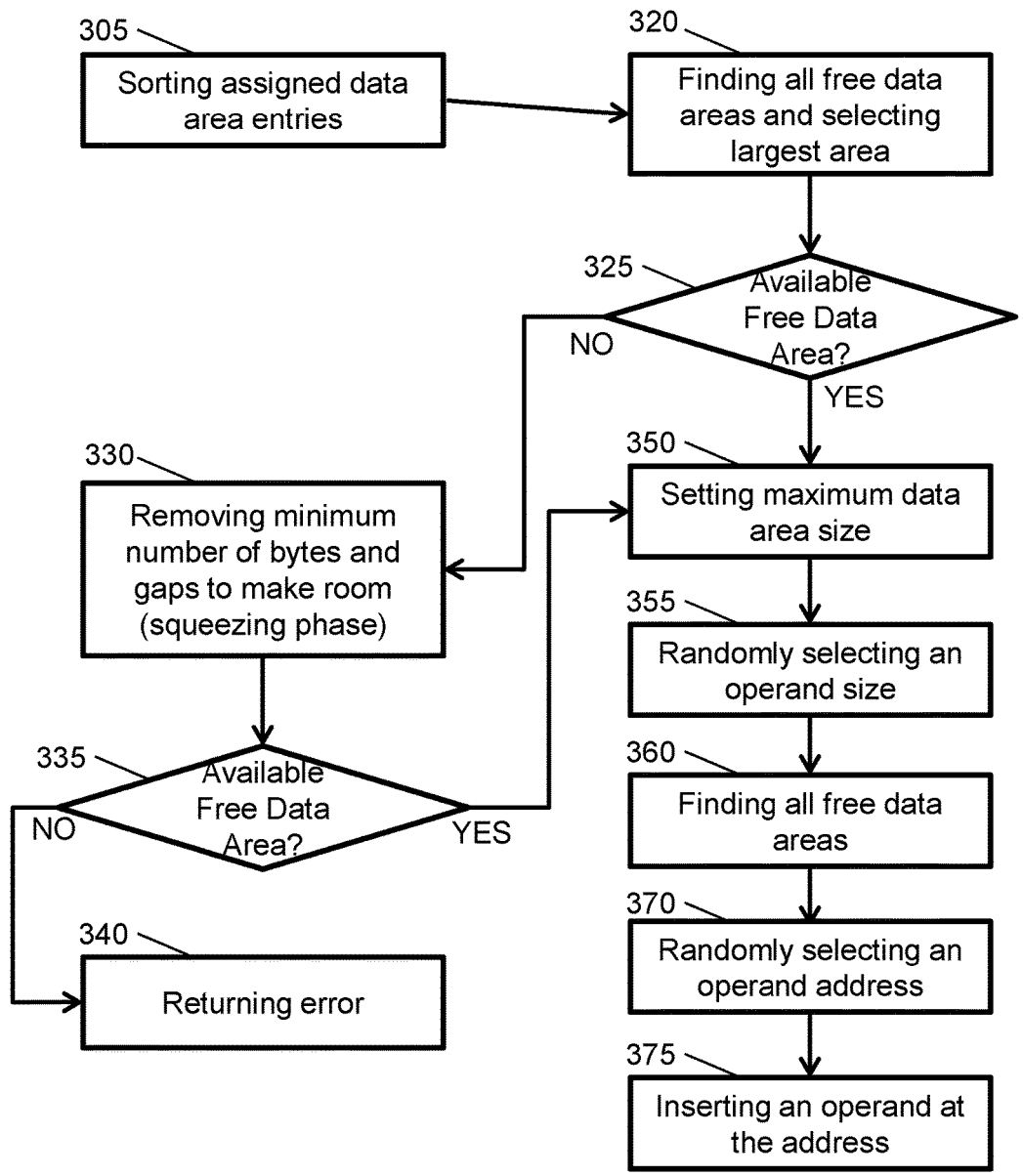
FIG. 3 illustrates a process flow of a data buffer manager for a variable length in accordance with an embodiment.

Turning now to FIG. 3, a process flow 300 of a data buffer manager for a variable length operand in accordance with an embodiment. The process flow 300, in general, relates to how a data buffer manager assigns one operand's data area at a time for a computer instruction when the operands are of a variable size. The process flow 300 begins at block 305, where a data manager sorts all assigned data area entries. In an embodiment, sorting assigned data area entries comprises sorting all the assigned data area entries (if more than one entry) of a data structure using the operand data area addresses in ascending order. At block 320, the data buffer manager finds all the free data areas based on the currently assigned data areas addresses and selects the largest free data area that can hold the maximum requested size of the operand's data area. From block 320, the process flow 300 proceeds to decision block 325.

At decision block 325, the data buffer manager determines the status of free data areas. For instance, the data buffer manager determines whether the free data area is less than the requested minimum. If the selected free data area is smaller than the operand's minimum data area that is requested by the caller, then the process flow 300 proceeds to block 330 (as indicated by the 'NO' arrow). At block 330, the data area manager removes a minimum number of bytes (between the minimum and current) and gaps of assigned data areas (from largest to smallest) to create enough room and then selects free data area. At decision block 335, the data buffer manager determines the status of free data areas. For instance, the data buffer manager determines whether the free data area is less than the requested minimum. If the selected free data area is smaller than the operand's minimum data area that is requested by the caller, then the process flow 300 proceeds to block 340 (as indicated by the 'NO' arrow). At block 340, the data buffer manager returns an error indicator to the caller (because there is not enough space in the data buffer). In an embodiment, the data area manager returns an error indicator to the caller because there is not enough space to insert the operand; for this case, the caller clears the common data structure API, either reduces the size of one or more operand data area (if possible), and/or increases the size of the data buffer and tries again.

Returning to decision blocks 325 and 335, the process flow 300 can proceed to block 350 when the selected free data area can support the operand's minimum data area that is requested by the caller (as indicated by the 'YES' arrows). That is, if at block 325 and 335 the free data area is large enough to hold the operand's data area, then this free space is selected for the operand. At block 350, the data buffer manager sets the maximum data area size to the smaller of the selected free data area size and the maximum size of the operand's data area. At block 355, the data buffer manager randomly selects the size of the operand's data area between the minimum and maximum data area size (e.g., it randomly selects the size of the operand's data area between the minimum and maximum data area size). At block 360, the data buffer manager find all the free data areas based on the currently assigned data areas addresses and selects the smallest data area that can hold the requested size of the operand's data area. Note these operations are for non-squeezing and squeeze paths.

At block 370, the data buffer manager randomly selects the address of the operand's data area between the selected free data area address and selected free data area end address minus randomly selected size. Note that the process flow 300 can also arrive at block 370 from decision blocks 325 and 335 when the free data area is large enough to hold the operand's data area and the size of the operand is fixed. At block 375, the data buffer manager randomly inserts the operand's data area into the selected free data area and creates a new entry in the common data structure with the operand's data area information.

Figure 4:
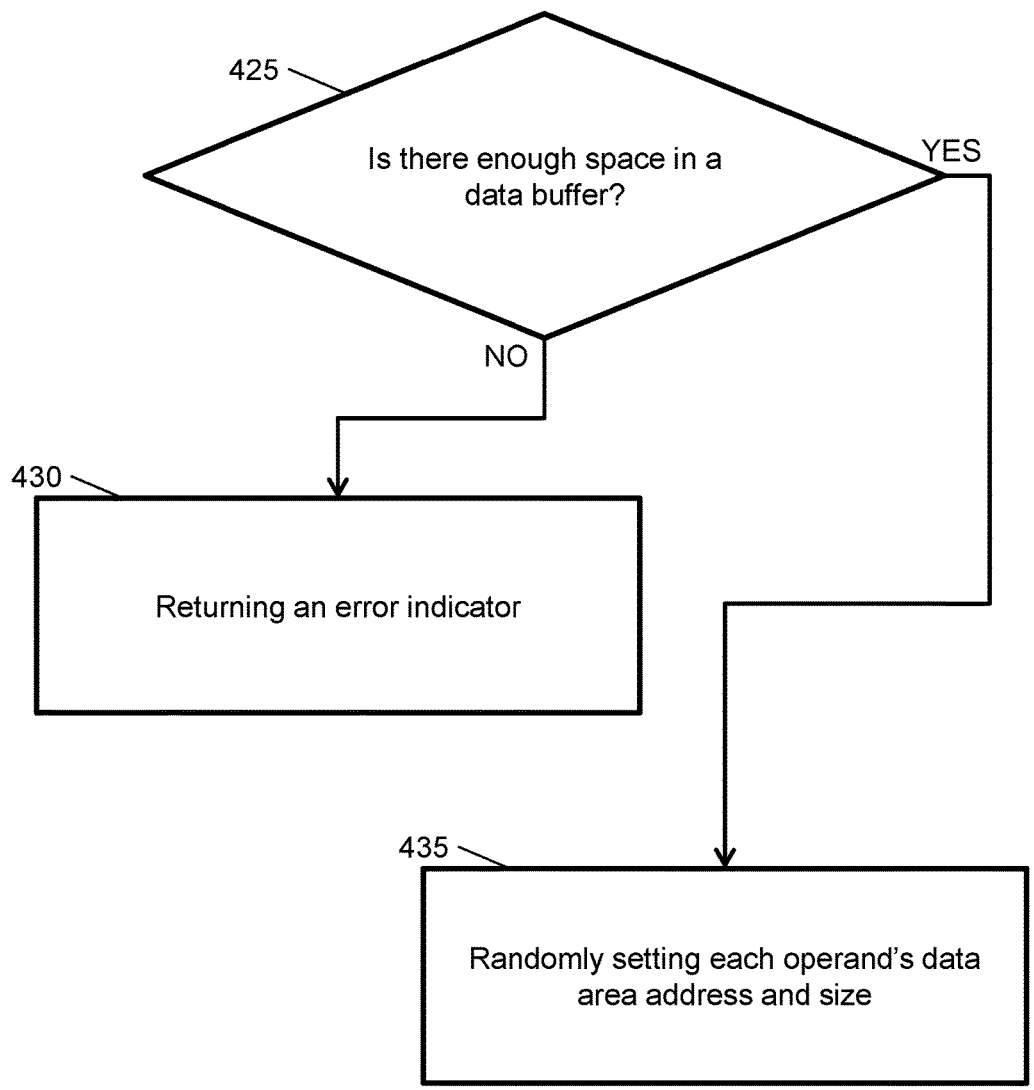
FIG. 4 illustrates a process flow of a data buffer manager for selection and insertion length in accordance with an embodiment.

FIG. 4 illustrates a process flow 400 of a data buffer manager for selection and insertion of operand's data area length in accordance with an embodiment. The process flow 400 relates to when the program (caller) first clears the data structure API. It then creates new entries of all the operands at once of the data structure API by setting the number of entries to a number of operands and stores each operand's minimum and maximum operand data area size (length) and all the required characteristics of the operand. For evenly distributed randomization of all the operand data areas of an instruction, the caller can randomly select the operand order. Then, the caller requests the data buffer manager to allocate all the operands data areas at once. In response, at decision block 425, the data buffer manager inspects all the operands minimum data area size to make sure that there is enough space in the data buffer.

If all the operands minimum data area size does not fit in the data buffer, the process proceeds to block 430 (as indicated by the 'NO' arrow). At block 430, the data buffer manager returns an error indicator to the caller because there is not enough space to insert all the operands; for this case, the program must increase the size of the data buffer and try again.

Figure 5:
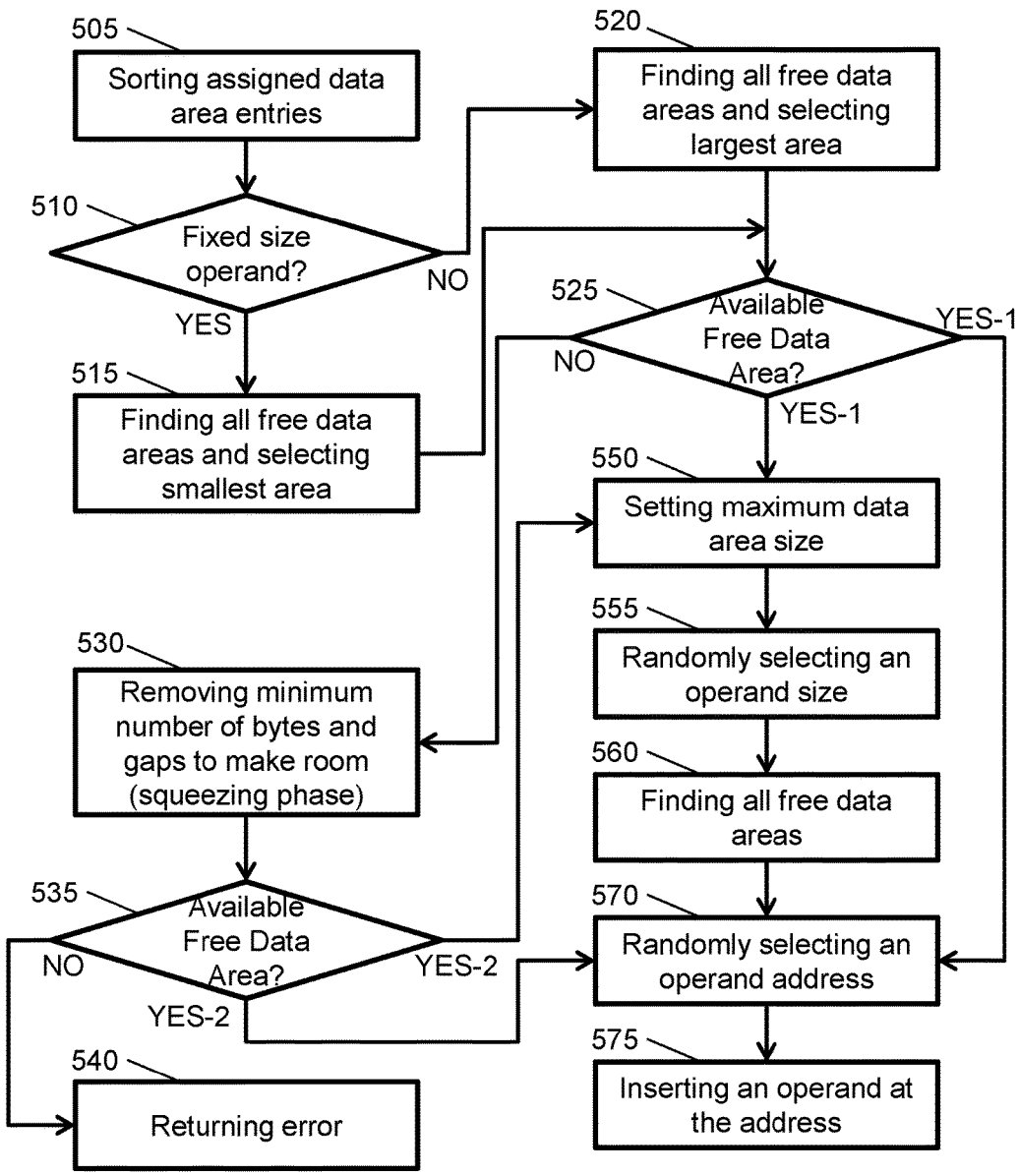
FIG. 5 illustrates a process flow of a data buffer manager in accordance with another embodiment.

Otherwise (as indicated by the 'YES' arrow), at block 435, the data buffer manager randomly sets each operand's data area address and size as shown in FIG. 5 below except that, in addition, the data buffer manager makes sure that there is enough room to build the rest of the operands data areas with their minimum data area sizes. For instance, the data buffer manager randomly inserts the operand's data area into the selected free data area and creates a new entry in the common data structure with the operand's data area information. In this way, it is guaranteed that the data buffer manager would not run out of room and then go through the squeezing phase (which may remove some randomness) to create enough free space to add the remaining operands data areas. The data buffer manager then inserts each operand's data area into the selected free data area and creates a new entry in the common data structure with the operand's data area information.

Turning now to FIG. 5, a process flow 500 of a data buffer manager in accordance with another embodiment. The process flow 500, in general, relates to how a data buffer manager assigns one operand's data area at a time for a computer instruction. To initiate the process flow 500, a program (caller) first clears the data structure API, creates one new operand entry at a time in the common data structure API by incrementing the number of entries by one, and stores the operand's minimum and maximum operand data area size (length) and all the required characteristics of the operand. For evenly distributed randomization of all the operand data areas of an instruction, the program can randomly select the order of each operand (i.e., for the sake of uniformity, all data areas can share the same randomness, and therefore the order of the operands can be random). Further, the program calls the data buffer manager to allocate this operand's data area.

The process flow 500 begins at block 505, where a data manager sorts assigned data entries. In an embodiment, sorting assigned data entries comprises sorting all the assigned data area entries (if more than one entry) of a data structure using the operand data area addresses in ascending order. That is, for each operand's data area request, the data buffer manager sorts all the data area entries (if more than one entry is present) of the data structure in ascending order using the operand data area addresses. Note that sorting only occurs if we have two or more operands (i.e., no sorting is performed on the first operand).

At decision block 510, the data buffer manager determines whether an operand of the computer instruction is a fixed size operand. For example, if the operand is a fixed size operand, then a two range length would have the same number. That is, when the range is from 32-32, then 32 would be a fixed size, with the first portion ending at 32 and the second portion ending at 32. In an embodiment, the data buffer manager determines whether the operand's data area is a fixed size. If the operand's data area is a fixed size, then the process flow 500 proceeds to block 515 (as indicated by the 'YES' arrow). Otherwise, the process flow 500 proceeds to block 520 (as indicated by the 'NO' arrow).

At block 515, the data buffer manager finds all free data areas based on currently assigned data areas addresses and selects the smallest free data area that can hold the requested size of the operand's data area. At block 520, the data buffer manager finds all the free data areas based on the currently assigned data areas addresses and select the largest free data area that can hold the maximum requested size of the operand's data area. From blocks 515 and 520, the process flow 500 proceeds to decision block 525.

At decision block 525, the data buffer manager determines the status of free data areas. For instance, the data buffer manager determines whether the free data area is less than a requested minimum. If the operand's selected data area is smaller than the operand's minimum data area that is requested by the caller, then the process flow 500 proceeds to block 530 (as indicated by the 'NO' arrow). At block 530, the data area manager removes a minimum number of bytes (between the minimum and current) and gaps of assigned data areas (from largest to smallest) to create enough room and then selects free data area. In an embodiment, the data area manager enters the squeezing phase where it removes the minimum number of assigned data area bytes (between the minimum and current data area) and free (gap) bytes between assigned data areas (from largest to smallest) to create/increase free space for the operand's data area. In a non-limiting example, the data area manager removes frees bytes between assigned data areas to increase the free data area size. At decision block 535, the data buffer manager determines the status of free data areas. For instance, the data buffer manager determines whether the free data area is less than the requested minimum. If the selected free data area is smaller than the operand's minimum data area that is requested by the caller, then the process flow 500 proceeds to block 540 (this can be considered the 'squeeze' path; as indicated by the 'NO' arrow)). At block 540, the data buffer manager returns an error indicator to the caller (because there is not enough space in the data buffer). In an embodiment, the data area manager returns an error indicator to the caller because there is not enough space to insert the operand; for this case, the caller clears the common data structure API, either reduces the size of one or more operand data area (if possible), and/or increases the size of the data buffer and tries again.

Returning to decision blocks 525 and 535, the process flow 500 can proceed to block 550 when the operand's selected data area can support the operand's minimum data area that is requested by the caller. Note that from blocks 525 to 550 (variable operand size) and 570 (fixed operand size) are considered 'non-squeeze' path (as indicated by the 'YES—1' arrow), and from blocks 535 to 550 (variable operand size) and 570 (fixed operand size) are considered 'squeeze' path (as indicated by the 'YES—2' arrow). That is, if at block 525 and 535 the free data area is large enough to hold the operand's data area, then this free space is selected for the operand. From decision block 535, the process flow 500 can proceed to block 550 when the free data area is large enough to hold the operand's data area and the size of the operand is variable.

At block 550, the data buffer manager sets the maximum data area size to the smaller of the selected free data area size and the maximum size of the operand's data area. That is, in an embodiment, if the selected free data area size is at least as large as the operand's minimum data area that is requested by the caller and the operand's size can vary, then the data area manager sets the operand's maximum data area size to the smaller of the selected free data area size and the maximum size of the operand's data area.

At block 555, the data buffer manager randomly selects the size of the operand's data area between the minimum and maximum data area size (e.g., it randomly selects the size of the operand's data area between the minimum and maximum data area size). At block 560, the data buffer manager find all the free data areas based on the currently assigned data areas addresses and selects the smallest data area that can hold the requested size of the operand's data area.

At block 570, the data buffer manager randomly selects the address of the operand's data area between the selected free data area address and selected free data area end address minus randomly selected size. Note that the process flow 500 can also arrive at block 570 from decision blocks 525 and 535 when the free data area is large enough to hold the operand's data area and the size of the operand is fixed. At block 575, the data buffer manager randomly inserts the operand's data area into the selected free data area and creates a new entry in the common data structure with the operand's data area information.

Figure 6:
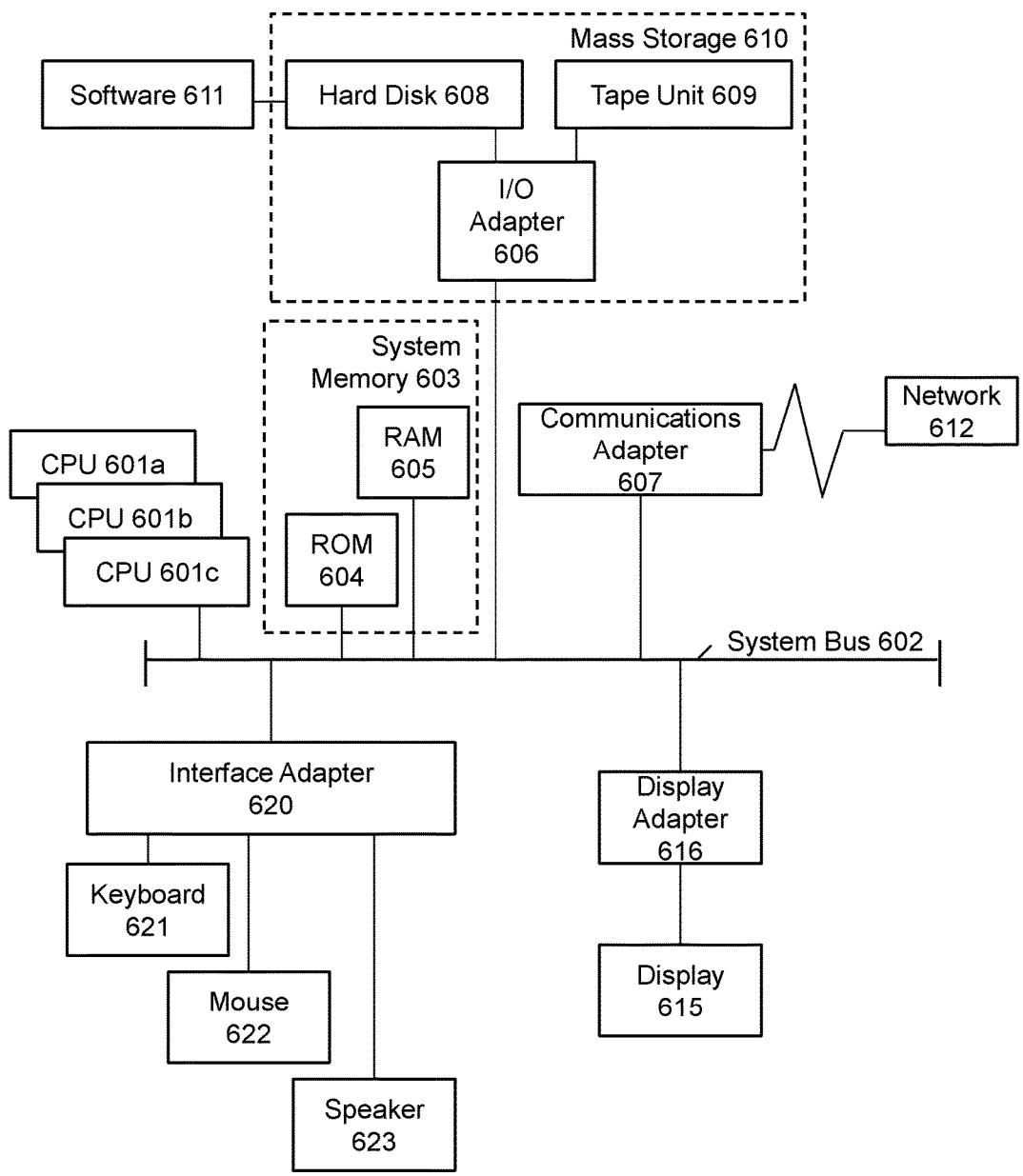
FIG. 6 illustrates a processing system in accordance with an embodiment.

Referring now to FIG. 6, there is shown an embodiment of a processing system 600 for implementing the teachings herein. In this embodiment, the processing system 600 has one or more central processing units (CPU(s)) 601a, 601b, 601c, etc. (collectively or generically referred to as processor(s) 601). The processors 601, also referred to as processing circuits, are coupled via a system bus 602 to system memory 603 and various other components. The system memory 603 can include a read only memory (ROM) 604 and a random access memory (RAM) 605. The ROM 604 is coupled to system bus 602 and may include a basic input/output system (BIOS), which controls certain basic functions of the processing system 600. The RAM is read-write memory coupled to the system bus 602 for use by the processors 601.

FIG. 6 further depicts an input/output (I/O) adapter 606 and a communications adapter 607 coupled to the system bus 602. The I/O adapter 606 may be a small computer system interface (SCSI) adapter that communicates with a hard disk 608 and/or tape unit (tape storage drive) 609 or any other similar component. The I/O adapter 606, the hard disk 608, and the tape unit 609 are collectively referred to herein as a mass storage 610. A software 611 for execution on the processing system 600 may be stored in the mass storage 610. The mass storage 610 is an example of a tangible storage medium readable by the processors 601, where the software 611 is stored as instructions for execution by the processors 601 to perform a method, such as the process flows of FIGS. 1-5. A communications adapter 607 interconnects the system bus 602 with a network 612, which may be an outside network, enabling the processing system 600 to communicate with other such systems. A display (e.g., screen, a display monitor) 615 is connected to the system bus 602 by a display adapter 616, which may include a graphics controller to improve the performance of graphics intensive applications and a video controller. In one embodiment, the adapters 606, 607, and 616 may be connected to one or more I/O buses that are connected to the system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 602 via an interface adapter 620 and the display adapter 616. A keyboard 621, a mouse 622, and a speaker 623 can be interconnected to the system bus 602 via the interface adapter 620, which may include, for example, a Super I/O chip integrating multiple device adapters into a single integrated circuit.

Thus, as configured in FIG. 6, the processing system 600 includes processing capability in the form of the processors 601, and, storage capability including the system memory 603 and the mass storage 610, input means such as the keyboard 621 and the mouse 622, and output capability including the speaker 623 and the display 615. In one embodiment, a portion of the system memory 603 and the mass storage 610 collectively store an operating system, such as the z/OS or AIX operating system from IBM Corporation, to coordinate the functions of the various components shown in FIG. 6.

Technical effects and benefits of the data buffer managers of embodiments herein include managing or handling any number of operands data areas in the program buffer. Thus, embodiments described herein are necessarily rooted in a processor to perform proactive operations to overcome problems specifically arising in the realm of computer instruction management (e.g., these problems include errors with respect to multiple operands, resulting in unwanted processing costs and errors).

Embodiments may include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a plurality of operands in a computer instruction, comprising:
  receiving, by a data buffer manager executed by a processor, information from a caller,
  wherein the information relates to the plurality of operands;
  comparing, by the data buffer manager, a free data area size of a data buffer to a requested minimum area of an operand size identified by the information;
  selecting, by the data buffer manager, an address of the data buffer when the requested minimum area is less than or equal to the free data area size; and inserting, by the data buffer manager, the operand at the address,
wherein the data area manager enters a squeezing phase to remove a minimum number of assigned data area bytes and free gap bytes between assigned data areas to create or increase the free data area size.

2. The method of claim 1, wherein the caller and the data buffer manager communicate through an application programmable interface.

3. The method of claim 1, wherein the information is received on a per-call basis, each call being respective to one of the plurality of operands.

4. The method of claim 1, wherein the information respective to each operand relates to a range-length-range of that operand.

5. The method of claim 1, wherein the caller issues the computer instruction to the data buffer manager to cause the receiving of information.

6. The method of claim 5, wherein the caller repeatedly calls the data buffer manager for each operand of the plurality of operands.

7. The method of claim 1, wherein the free data size corresponds to a data area available in a data buffer managed by the data buffer manager.

8. The method of claim 1, wherein the data buffer manager issues an error to the caller when the requested minimum area is greater than the free data area size.

9. A computer program product, the computer program product comprising a computer readable storage medium having program instructions for managing a plurality of operands in a computer instruction embodied therewith, the program instructions executable by a processor to cause a data buffer manager to perform:
receiving, by the data buffer manager, information from a caller,
wherein the information relates to the plurality of operands;
comparing, by the data buffer manager, a free data area size of a data buffer to a requested minimum area of an operand size identified by the information;
selecting, by the data buffer manager, an address of the data buffer when the requested minimum area is less than or equal to the free data area size; and
inserting, by the data buffer manager, the operand at the address,
wherein the data area manager enters a squeezing phase to remove a minimum number of assigned data area bytes and free gap bytes between assigned data areas to create or increase the free data area size.

10. The computer program product of claim 9, wherein the caller and the data buffer manager communicate through an application programmable interface.

11. The computer program product of claim 9, wherein the information is received on a per-call basis, each call being respective to one of the plurality of operands.

12. The computer program product of claim 9, wherein the information respective to each operand relates to a range-length-range of that operand.

13. The computer program product of claim 9, wherein the caller issues the computer instruction to the data buffer manager to cause the receiving of information.

14. The computer program product of claim 13, wherein the caller repeatedly calls the data buffer manager for each operand of the plurality of operands.

15. The computer program product of claim 9, wherein the free data area size corresponds to a data available in a data buffer managed by the data buffer manager.

16. The computer program product of claim 9, wherein the data buffer manager issues an error to the caller when the requested minimum area is greater than the free data area size.

17. A system, comprising a processor and a memory storing program instructions for managing a plurality of operands in a computer instruction thereon, the program instructions executable by a processor to cause a data buffer manager of the system to perform:
receiving, by the data buffer manager, information from a caller,
wherein the information relates to the plurality of operands;
comparing, by the data buffer manager, a free data area size of a data buffer to a requested minimum area of an operand size identified by the information;
selecting, by the data buffer manager, an address of the data buffer when the requested minimum area is less than or equal to the free data area size; and
inserting, by the data buffer manager, the operand at the address,
wherein the data area manager enters a squeezing phase to remove a minimum number of assigned data area bytes and free gap bytes between assigned data areas to create or increase the free data area size.

18. The system of claim 17, wherein the caller and the data buffer manager communicate through an application programmable interface.

* * * * *